United States Patent [19]

Smoliar

[11] 4,301,450
[45] Nov. 17, 1981

[54] ERROR DETECTION FOR MULTI-SEGMENTED INDICIA DISPLAY

[75] Inventor: Gerald D. Smoliar, Erdenheim, Pa.

[73] Assignee: Burroughs Corporation, Detroit, Mich.

[21] Appl. No.: 118,626

[22] Filed: Feb. 4, 1980

[51] Int. Cl.³ .............................................. G09G 3/04
[52] U.S. Cl. .................................... 340/715; 340/701; 340/791; 340/756
[58] Field of Search ............... 340/715, 701, 702, 703, 340/704, 791, 792, 793, 756, 760, 762

[56] References Cited

U.S. PATENT DOCUMENTS

| | | | |
|---|---|---|---|
| 3,585,629 | 6/1971 | Baynard, Jr. | 340/715 |
| 3,609,751 | 9/1971 | Siegel | 340/701 |
| 3,719,937 | 3/1973 | Doyle | 340/715 |
| 3,753,226 | 8/1973 | Schnurmann et al. | 340/715 |
| 3,813,664 | 5/1974 | Geyer et al. | 340/715 |
| 3,866,171 | 2/1975 | Loshbough | 340/715 |

Primary Examiner—Marshall M. Curtis
Attorney, Agent, or Firm—Francis A. Varallo; K. R. Peterson; E. M. Chung

[57] ABSTRACT

An error detecting unambiguous multi-segmented indicia display method and apparatus is disclosed wherein an "OFF" segment is illuminated differently than an "ON" segment of the display to verify that the "OFF" segment is indeed "OFF" and not a malfunctioning "ON" segment. In the preferred embodiment a pulsating voltage is supplied to the "OFF" segments to provide a lower integrated average voltage and therefore a lower brilliance of display. In an alternate embodiment a contiguous "OFF" segment of one color is provided next to each "ON" segment so as to indicate unambiguously that each non-illuminated "ON" segment is in fact indicating "OFF".

12 Claims, 5 Drawing Figures

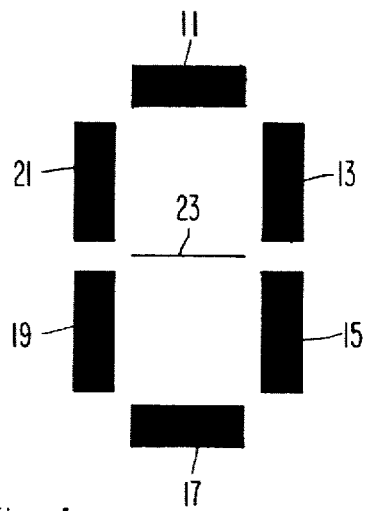
_Fig.1_
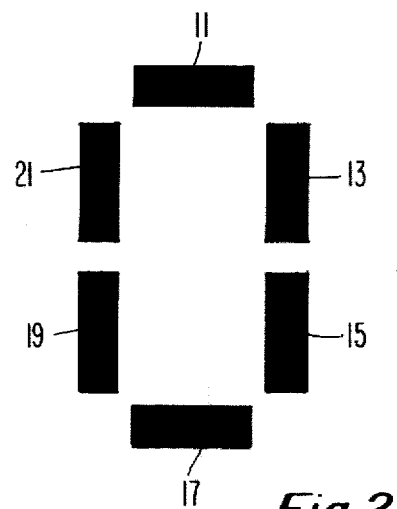
_Fig.2_
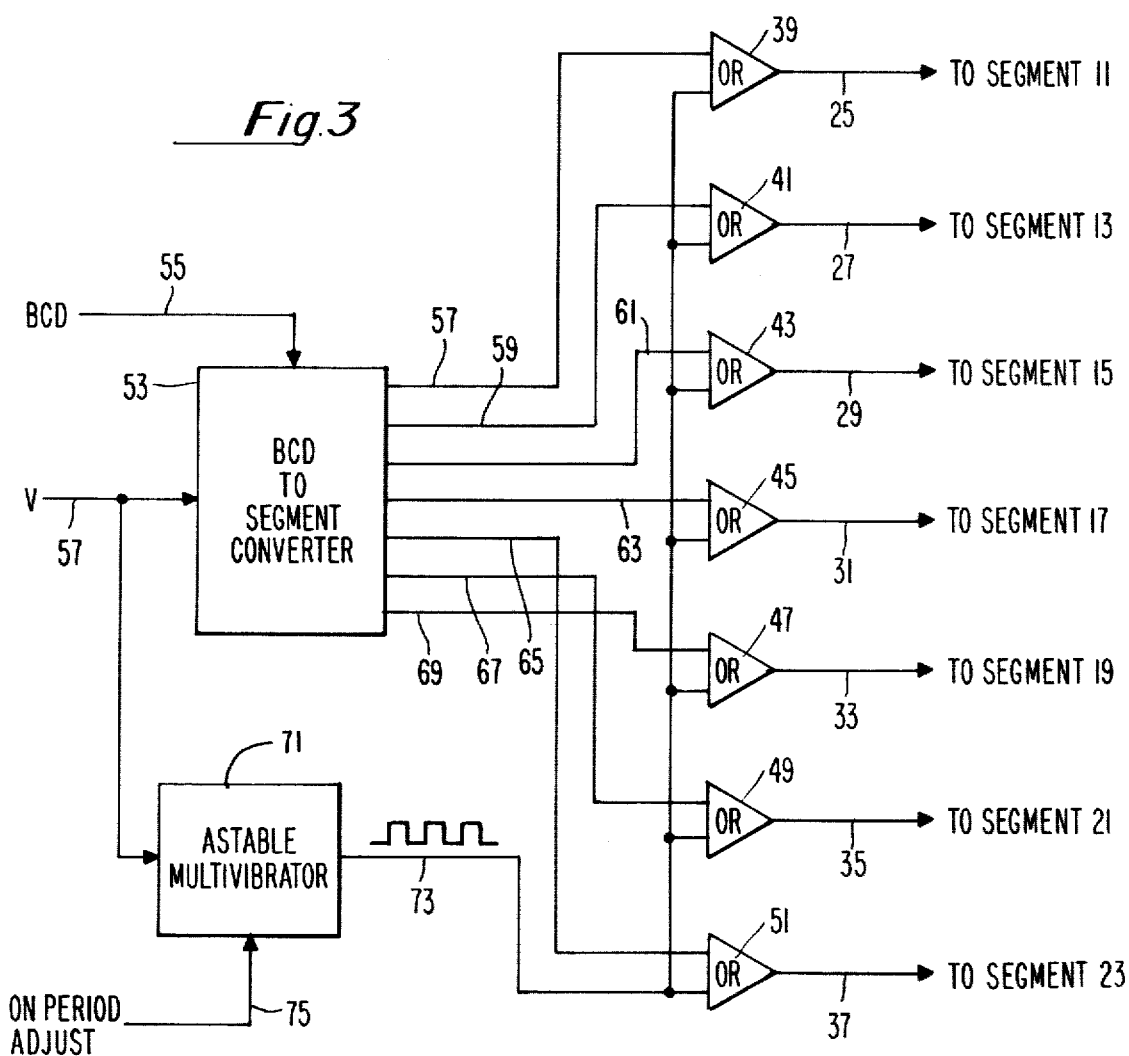
_Fig.3_

ERROR DETECTION FOR MULTI-SEGMENTED INDICIA DISPLAY

BACKGROUND OF THE INVENTION

This invention relates to error detection and more particularly to an improved circuit for verifying that a digital display is operating correctly.

With the development of digital circuitry and particularly of digital circuitry involving integrated circuit techniques, the use of digital displays has become increasingly important. Digital displays are now commonly used, for example, on calculators, in scale or weight measuring systems and to replace analog gauges and readouts in various measuring and control systems. Due to the low cost, seven-segmented readout devices are commonly used for digital numeric indicators. By illuminating various combinations of the seven segments, the numbers zero through nine may be formed. The individual segments may be illuminated by various techniques such as by means of incandescent lamps, light emitting diodes, gas discharge tubes or electroluminescence. However, each of the commonly used devices may be subject to failure. Failure may occur as a result of an open circuit or a short circuit in one or more segments or as a result of a fault in the circuitry for energizing a segment. One difficulty with the segment type readout devices is that the failure of one segment may cause the device to indicate an erroneous number. If, for example, the uppermost segment has failed, the number 7 will appear as a number 1.

Various circuits have been proposed in the prior art for detecting failures or faults in segment type readout devices. In devices involving incandescent lamps, for example, circuits have been designed for detecting an open filament on any energized lamp. However, such devices generally do not indicate the failure of an unenergized lamp. Nor will such circuits verify that each segment that should be illuminated is in fact illuminated and that each segment that should be off is in fact off.

OBJECTS AND SUMMARY OF THE INVENTION

It is therefore an object of the invention to provide an unambiguous multi-segmented indicia display.

It is another object of the invention to provide a positive visual indication for each "OFF" segment of a multi-segmented indicia display.

The above and other objects and features of the present invention is realized in a multi-segmented display wherein each "OFF" segment is illuminated in a fashion to distinguish it from both a functioning and a malfunctioning "ON" segment. Various embodiments of the invention include variations in brilliance and/or color between "ON" segments and "OFF" segments in a multi-segmented indicia display.

The system configuration and operational details given above have been presented in simplified form. Other features of the invention will become more fully apparent in the drawings and detailed description presented hereinafter.

BRIEF DESCRIPTION OF THE DRAWING

FIG. 1 is an illustration of a seven segment display functioning unambiguously in operation with the present invention;

FIG. 2 is an illustration of a seven segment display functioning ambiguously;

FIG. 3 is a logic diagram of illuminating apparatus for generating the unambiguous display of FIG. 1;

DESCRIPTION OF THE PREFERRED EMBODIMENT

Figure 4:
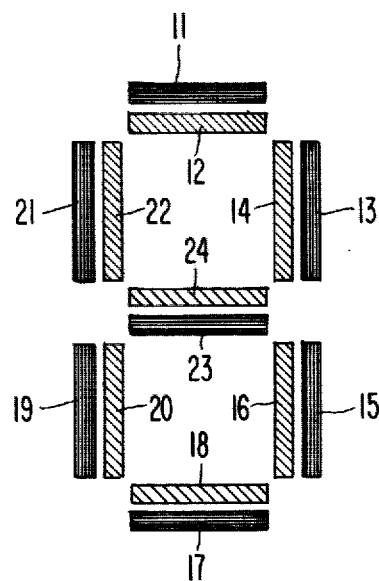
FIG. 4 is an illustration of a seven segment display in an alternate embodiment capable of functioning unambiguously in accord with the operation of the present invention.

Referring now to FIG. 1, an illustration is shown of the segment layout for a typical seven-segment readout device. The seven segments identified as elements 11, 13, 15, 17, 19, 21, and 23 may be illuminated by any conventional means. Commonly, segments are illuminated by incandescent means, gas discharge tubes, light emitting diodes, and liquid crystal means. FIG. 1 shows an unambiguous display of the number 0 in accord with the operation. Thus, the six elements, elements 11, 13, 15, 17, 19, and 21 which form the number 0 are illustrated as being brilliantly lit while the crossbar member 23 is shown and illustrated as being only partially lit. It is clear from a glance or a continuous observation of the display that the crossbar segment 23 is present and operative without being fully energized. Thus it is clear that the number being illustrated by the display of FIG. 1 is actually the number 0 and not a malfunctioning display of the number 8.

FIG. 2 illustrates an ambiguous display of the number 0. Note that by comparison to FIG. 1 that the crossbar member segment 23 is not present by being either fully or partially displayed. Thus one is not sure whether the segment 23 should be lit but is not because either that segment is malfunctioning or circuits between the segment driving logic and the segment itself are open. FIG. 2 represents both the prior art, and in operation with the present invention, a display in which an ambiguity is definitely and clearly displayed. Thus, in accord with the operation of the present invention, the observer of the display as illustrated in FIG. 2 would know immediately that the display is ambiguous and may or may not be representing the number 0, and therefore can take corrective and remedial action to verify whether or not the display is the number 0 or the number 8. This observation of ambiguity is continuous and requires no testing or otherwise non-automatic monitoring operation or additional monitoring.

An embodiment of hardware to implement the display of FIG. 1 is shown in FIG. 3. The voltages that drive segments 11, 13, 15, 17, 19, 21, and 23 are outputted on lines 25, 27, 29, 31, 33, 35, and 37 respectively as being generated the outputs of OR circuits 39, 41, 43, 45, 47, 49, and 51, respectively. To generate the display signals, a BCD segment converter 53 is utilized. The converter 53 takes a BCD encoded input signal on line 55 which represents in binary coded decimal form a specific numerical number and generates an output on lines 57, 59, 61, 63, 65, 67, and 69 which will illuminate the upper segments 11, 13, 15, 17, 19, 21, and 23 to display the binary coded decimal representation inputted on line 55 by converter 53. The voltage inputted on line 57 is thus outputted for display purposes according to the electrical representation on input line 55. Although the preferred embodiment illustrates a binary coded decimal input on line 55 it is realized that alternate embodiments may use any electrical representation of a numerical, or for that matter alphanumeric indicia, to generate the proper output as is known in the art. To provide an unambiguous error detecting indicia display an astable multivibrator 71 is utilized to generate a pulsed output on line 73 which represents a pulsed version of the voltage inputted on that line 73. The pulsed output 73 is provided to all of the all OR circuits 39, 41, 43, 45, 47, 49, and 51. Thus in operation of the invention, segments 11, 13, 15, 17, 19, 21, and 23 are always provided a full voltage level or a pulsed voltage level. The pulsed voltage level having an average lower voltage level will with the preferred embodiment of the display produce an indication of much lower brilliance than a full level display. If needed, capacitors or other integrating devices could be used to assure that the pulse level provides an average voltage level which will according to the particular display used provide a segment which is not fully lit but only partially lit. Further, to control the level of brilliance of a segment that is not to be fully energized, an "ON" period adjustment 75 is provided to the multivibrator circuit to provide pulses of longer or shorter duration thus increasing or decreasing the average brilliance of the segment which is not fully energized to provide a illumination which is sufficiently brilliant to be seen but not sufficiently brilliant to cause confusion with the fully energized segments. Further, it is noted that the voltage provided on input 57 to the converter 53 and the astable multivibrator 71 may be a voltage which is variable and dependent upon the ambient lighting surrounding a display so that in brilliant ambient lighting the display may be intense whereas at night or in dim lighting ambient environments the display may be subdued.

With reference to FIG. 4 an alternate embodiment of a display is shown wherein elements 11, 13, 15, 17, 19, 21, and 23 are all one color, preferably red, and correspondingly aligned segments 12, 14, 16, 18, 20, 22, 24 are of another color, preferably green. The red segments when illuminated indicate "ON" and the green segments when illuminated indicate "OFF". Absence of both red or green for any one segment indicates an ambiguity.

Figure 5:
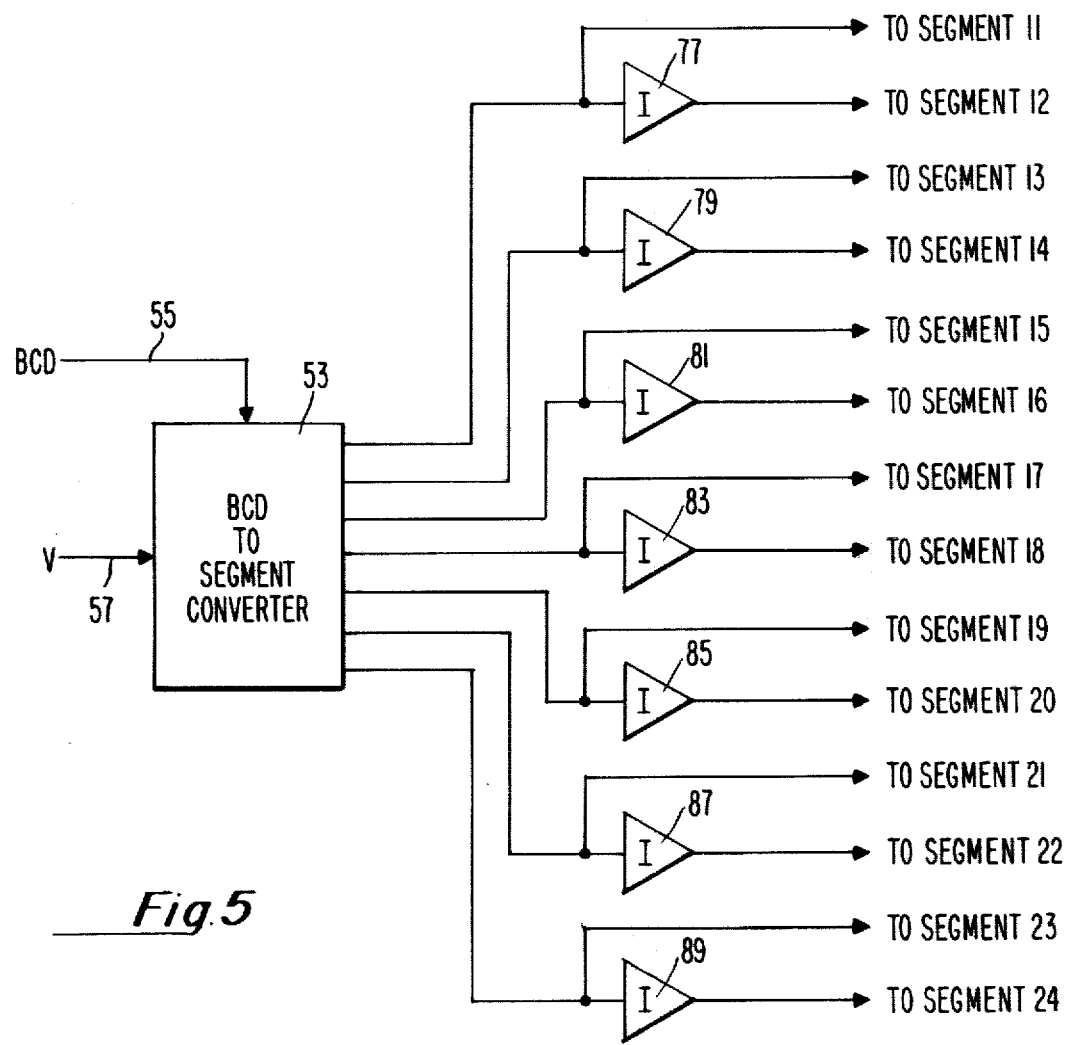
FIG. 5 is a logic diagram of illuminating apparatus for generating an unambiguous display using the alternate embodiment of FIG. 4.

Hardware to drive the alternate display of FIG. 4 is shown in FIG. 5. A BCD-to-segment converter 53 outputs directly to segments 11, 13, 15, 17, 19, 21, and 23. Inverters 77, 79, 81, 83, 85, 87 and 89 are interposed between the BCD-to-segment converter 53 and the segments 12, 14, 16, 18, 20, 22, and 24, respectively.

The features of the hardware shown in FIG. 3 and FIG. 5 may be combined so as to provide a pulsing or lower voltage input to the inverters 77, 79, 81, 83, 85, 87, and 89. This would lower the voltage and where appropriate the intensity to the "OFF" segments 12, 14, 16, 18, 20, 22, and 24.

Having shown and described preferred embodiments of the invention, those skilled in the art will realize that various omissions, substitutions and changes in the forms and details of the apparatus illustrated and its operation may be made without departing from the spirit of the invention. It is the intention, therefore, to be limited only as indicated by the scope of the following claims.

What is claimed is:

1. In an indicia display having a plurality of illuminable segments, an error detection illuminating apparatus comprising:

input means carrying coded signals representing data to be displayed;

a plurality of logical OR circuits, each logical OR circuit individually associated with and driving a single segment in said plurality of illuminable segments;

signal generator means for providing every logical OR circuit in said plurality thereof with a pulsed voltage signal;

converter means responsive to said input means for providing selected logical OR circuits in said plurality thereof with a constant level voltage signal;

whereby selected segments of said plurality of illuminable segments associated respectively with said selected logical OR circuits receive concurrently said constant level voltage signal and said pulsed voltage signal and the nonselected segments of said plurality of illuminable segments receive only said pulsed voltage signal.

2. The error detection illuminating apparatus according to claim 1 further including means for adjusting the "ON" period of the astable multivibrator output pulses, thereby controlling the brightness of said nonselected segments.

3. The error detection illuminating apparatus according to claim 1 signal generator means is an astable multivibrator.

4. The error detection illuminating apparatus according to claim 1 or 3 wherein said converter means is a BCD-to-segment converter.

5. In an indicia display, an error detection illuminating apparatus comprising:

a plurality of illuminable segments of a first color;

a plurality of illuminable segments of a second color, each segment thereof being individually associated with and situated adjacent to a single segment in said plurality of illuminable segments of said first color;

input means carrying coded signals representing data to be displayed;

converter means responsive to said input means for providing a first illuminating signal to selected segments in said plurality of illuminable segments of said first color;

inverter means responsive to said converter means, said inverter means providing a second illuminating signal to those segments in said plurality of illuminable segments of said second color which are adjacent respective nonselected segments of said first color.

6. The error detection illuminating apparatus according to claim 5 wherein said converter means is a BCD-to-segment converter.

7. In a visually segmented indicia display an error detection illuminating apparatus comprising:

a plurality of illuminable segments positioned in predetermined selectable locations to provide said display;

input means carrying coded signals representing data to be displayed;

converter means coupled to said input means and responsive thereto;

first means responsive to the output of said converter means for generating a first visual appearance at nonselected segment locations;

second means for controlling said first means and responsive to said converter means for providing a second visually distinct appearance at selected segment locations;

both said first and said second visual appearances being distinct from a third visual appearance at any given segment location resulting from the total inoperativeness of the illuminable segments at said given location.

8. The error detection illuminating apparatus according to claim 7 wherein said first visual appearance is characterized by a full brilliance and said second visual appearance is characterized by partial brilliance.

9. The error detection illuminating apparatus according to claim 7 or 8 wherein said second means provides full brilliance level voltage to said visually segmented indicia display and said first means for illuminating provides an averaged partial brilliance level voltage to said visually segmented indicia display.

10. The error detection illuminating apparatus according to claim 9 wherein said averaged partial brilliance level voltage provided by said first means is a pulsed voltage alternating between a full brilliance level and a no brilliance level.

11. The error detection illuminating apparatus according to claim 7 wherein said first visual appearance is characterized by a first color and said second visual appearance is characterized by a second color, said second color being visually distinct from said first color.

12. The error detection illuminating apparatus according to claim 11 wherein said first visual appearance is further characterized by full brilliance and said second visual appearance is further characterized by partial brilliance.

* * * * *